United States Patent
Achan et al.

(10) Patent No.: US 11,087,237 B2
(45) Date of Patent: Aug. 10, 2021

(54) MACHINE LEARNING TECHNIQUES FOR TRANSMITTING PUSH NOTIFICATIONS

(71) Applicant: WALMART APOLLO, LLC, Bentonville, AR (US)

(72) Inventors: Kannan Achan, Saratoga, CA (US); Evren Korpeoglu, Sunnyvale, CA (US); Abhimanyu Mitra, San Jose, CA (US); Sinduja Subramaniam, San Jose, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 799 days.

(21) Appl. No.: 15/883,743

(22) Filed: Jan. 30, 2018

(65) Prior Publication Data

US 2019/0236488 A1 Aug. 1, 2019

(51) Int. Cl.
  *G06N 99/00* (2019.01)
  *G06N 7/00* (2006.01)
  *H04L 29/08* (2006.01)
  *G06N 20/00* (2019.01)
  *G06Q 30/02* (2012.01)

(52) U.S. Cl.
  CPC ............. *G06N 20/00* (2019.01); *G06N 7/005* (2013.01); *G06Q 30/0251* (2013.01); *H04L 67/26* (2013.01); *H04L 67/306* (2013.01)

(58) Field of Classification Search
  CPC ... H04L 67/26; H04L 67/306; G06Q 30/0251; G06N 7/005; G06N 20/00
  See application file for complete search history.

(56) References Cited

U.S. PATENT DOCUMENTS

| | | | |
|---|---|---|---|
| 2008/0189350 A1* | 8/2008 | Vasa | H04L 41/5009 709/201 |
| 2009/0234683 A1* | 9/2009 | Anderson | G06Q 20/10 705/38 |
| 2017/0004469 A1* | 1/2017 | Cassel | G06Q 20/14 |
| 2018/0060954 A1* | 3/2018 | Yin | G06F 21/31 |
| 2018/0349363 A1* | 12/2018 | Jujjuri | G06F 16/1827 |
| 2019/0279241 A1* | 9/2019 | DiTomaso | H04L 9/3239 |

* cited by examiner

*Primary Examiner* — Abdullahi E Salad
(74) *Attorney, Agent, or Firm* — Bryan Cave Leighton Paisner LLP (57) ABSTRACT

Systems and methods including one or more processing modules and one or more non-transitory storage modules storing computing instructions configured to run on the one or more processing modules and perform acts of: utilizing historical transaction information to derive metric information associated with prior transactions; generating a listing of user-item pairs, each of the user-item pairs identifying a user and an item; executing a machine learning model that is configured to generate a transmission list for sending push notifications; generating a transmission list by selecting user-item pairs based on the conversion probability values and the confidence indicators that are assigned to the user-item pairs; customizing content for the push notifications to include information for items identified by the user-item pairs included in the transmission list; and transmitting the push notifications to the users identified by the user-item pairs included in the transmission list. Other embodiments are disclosed herein.

20 Claims, 6 Drawing Sheets

| 410– Utilizing historical transaction information to derive metric information associated with prior transactions |

| 420– Generating a listing of user-item pairs |

| 430– Executing a machine learning model that utilizes the metric information to generate : (1) conversion probability values that indicate probabilities that users will purchase items identified by corresponding user-item pairs; and (2) confidence indicators that identify confidence levels in the conversion probability values |

| 440– Generating a transmission list that identifies the user-item pairs that will be utilized to generate the push notifications based on the conversion probability values and the confidence indicators assigned to the user-item pairs |

| 450– Customizing content for the push notifications to include information for items identified by the user-item pairs in the transmission list |

| 460– Transmitting the push notifications to the users identified by the user-item pairs included in the transmission list |

510 – Generating a first subset of user-item pairs by comparing confidence indicators for user-item pairs to a first threshold 520 – Generating a second subset of user-item pairs by comparing conversion probability values for user-item pairs to a second threshold 530 – Generating a third subset of user-item pairs by determining an intersection of the first subset and the second subset 540 – Eliminating user-item pairs from the third subset of user-item pairs if shipping thresholds are not satisfied 550 – Generating a transmission list based on the user-item pairs remaining in the third subset of user-item pairs

MACHINE LEARNING TECHNIQUES FOR TRANSMITTING PUSH NOTIFICATIONS

TECHNICAL FIELD

This disclosure relates generally to machine learning techniques that are configured to push notifications to user devices with customized content.

BACKGROUND

Conventional push notification systems can be configured to transmit notifications to users that include information about purchasing items. For example, these systems typically initiate a batch transmission that sends the same notification to all individuals identified in list. The notifications are sent in a non-discriminatory fashion that does not take into account whether or not intended recipients are interested in receiving the push notifications or whether the intended recipients are interested in the items identified in the push notifications. Consequently, the techniques used by these conventional push notification systems to transmit the push notifications unnecessarily waste network bandwidth and system resources that could be allocated to other more useful functions. These conventional techniques also result in very low conversion rates with respect to recipients of the push notifications purchasing the items identified in the push notifications.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 1:
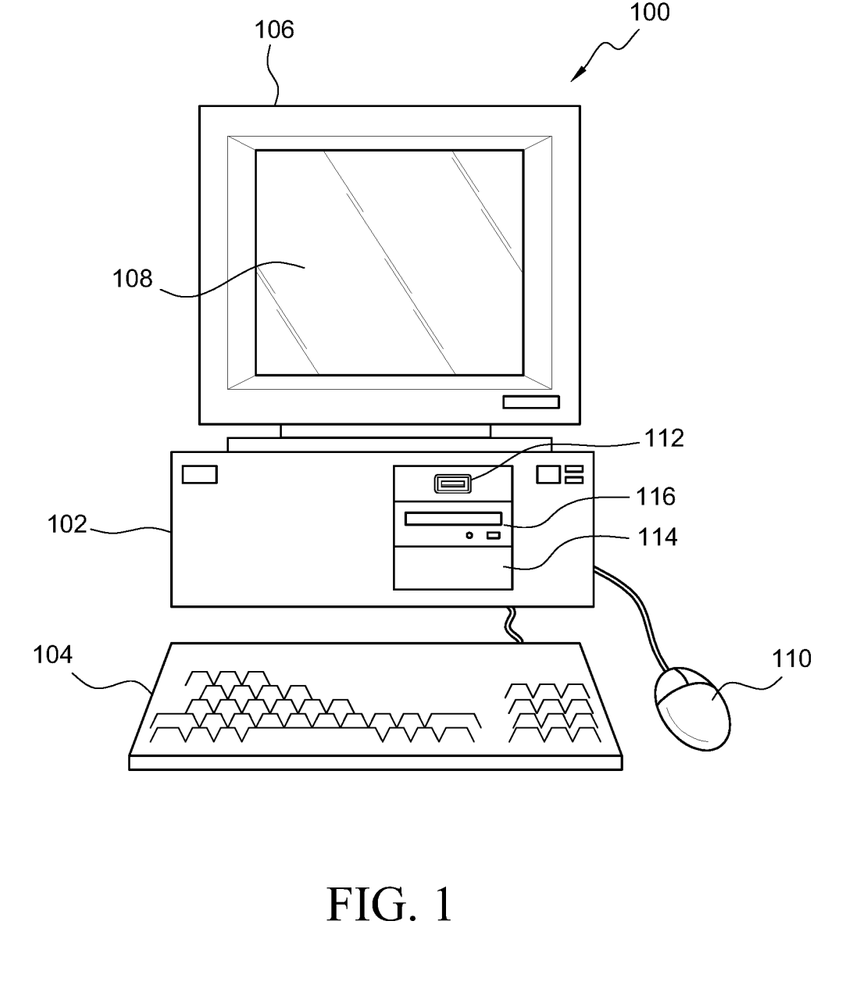
FIG. 1 illustrates a front elevational view of a computer system that is suitable for implementing various embodiments of the systems disclosed in FIGS. 3 and 6.
Figure 2:
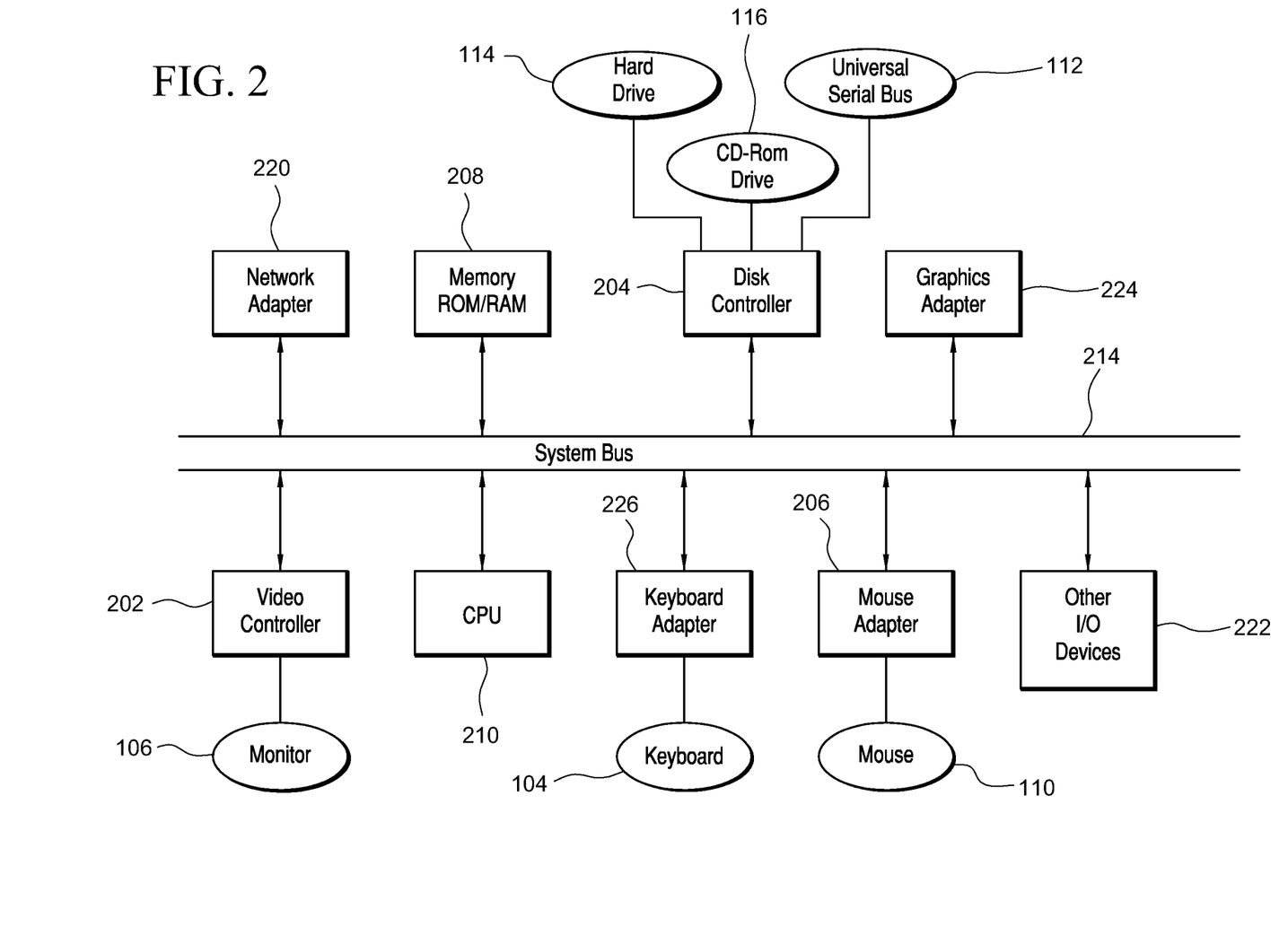
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
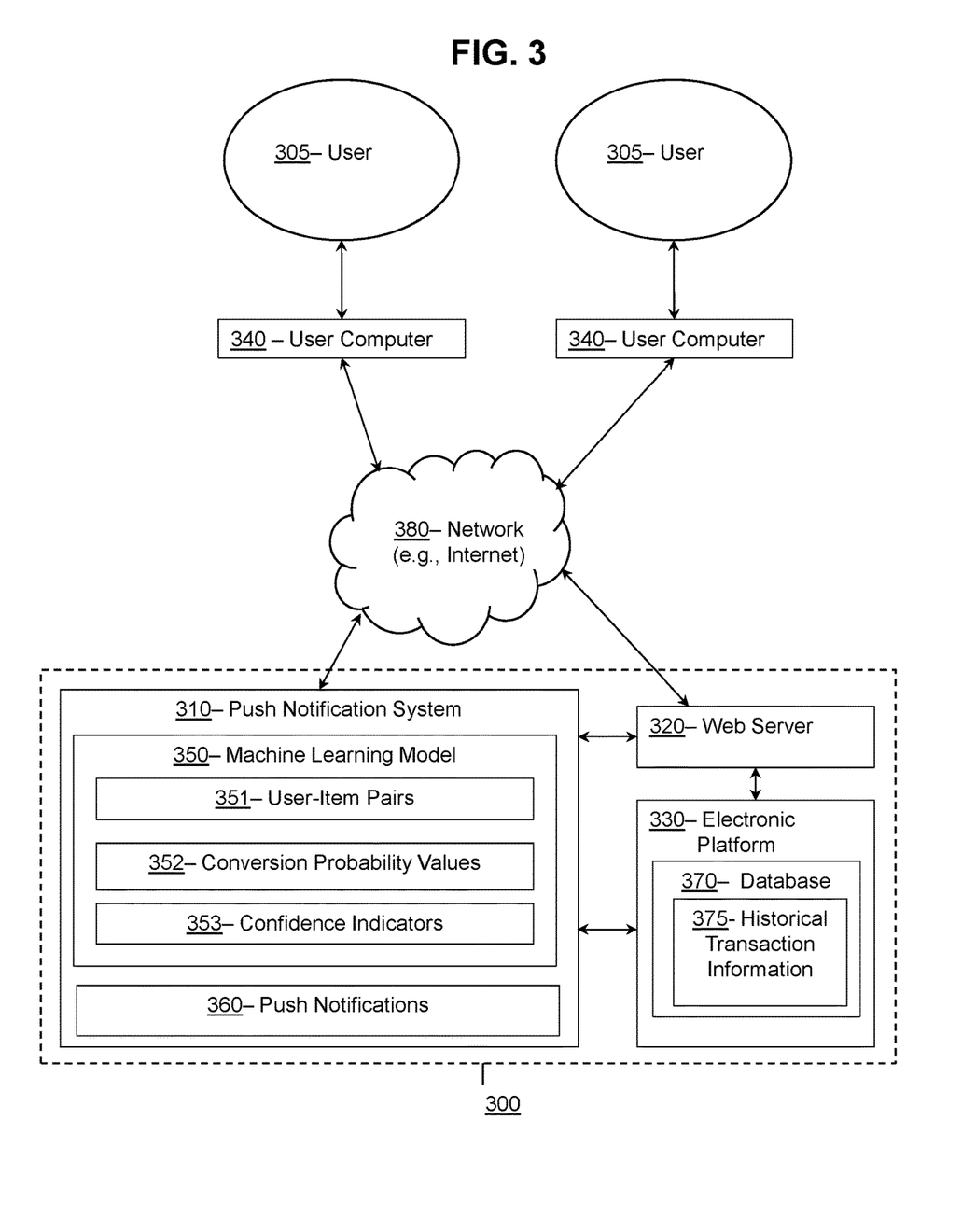
FIG. 3 illustrates a representative block diagram of a system according to certain embodiments.

Turning ahead in the drawings, FIG. 3 illustrates a block diagram of a system 300 that can be employed for transmitting push notifications to users based on machine learning techniques described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a push notification system 310, a web server 320, and/or an electronic platform 330. The push notification system 310, the web server 320, and/or the electronic platform 330 can each be a computer system, such as computer system 100 (FIG. 1), as described above, and can each be a single computer, a single server, or a cluster or collection of computers or servers, or a cloud of computers or servers. In another embodiment, a single computer system can host each of two or more of push notification system 310, the web server 320, and the electronic platform 330 are described herein.

In many embodiments, system 300 also can comprise user computers 340. In some embodiments, user computers 340 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through a network 380 (e.g., the Internet) with user computers (e.g., 340). In certain embodiments, user computers 340 can be desktop computers, laptop computers, smart phones, tablet devices, and/or other endpoint devices. Web server 320 can host one or more websites. For example, web server 320 can host an online shopping website that allows users to browse and/or search for products, to add products to an electronic shopping cart, and/or to purchase products, in addition to other suitable activities.

In many embodiments, the push notification system 310, the web server 320, and/or the electronic platform 330 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of the push notification system 310, the web server 320, and/or the electronic platform 330 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of the push notification system 310, the web server 320, and/or the electronic platform 330. In a similar manner, the processing module(s) and the memory storage module(s) can be local and/or remote to each other.

In many embodiments, the push notification system 310, the web server 320, and/or the electronic platform 330 can be configured to communicate with one or more user computers 340. In some embodiments, user computers 340 also can be referred to as customer computers. In some embodiments, the push notification system 310, the web server 320, and/or the electronic platform 330 can communicate or interface (e.g., interact) with one or more customer computers (such as user computers 340) through a network 380, e.g., such as one that includes the Internet. Network 380 can be an intranet that is not open to the public. Accordingly, in many embodiments, the push notification system 310, the web server 320, and/or the electronic platform 330 (and/or the software used by such systems) can refer to a back end of system 300 operated by an operator and/or administrator of system 300, and user computers 340 (and/or the software used by such systems) can refer to a front end of system 300 used by one or more users 305, respectively. In some embodiments, users 305 also can be referred to as customers, in which case, user computers 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, the push notification system 310, the web server 320, and/or the electronic platform 330 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication among the push notification system 310, the web server 320, and the electronic platform 330, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

A number of embodiments can include a system. The system can include one or more processing modules and one or more non-transitory storage modules storing computing instructions configured to run on the one or more processing modules. The one or more storage modules can be configured to run on the one or more processing modules and perform the act of: utilizing historical transaction information to derive metric information associated with prior transactions; generating a listing of user-item pairs, each of the user-item pairs identifying a user and an item; executing a machine learning model that is configured to generate a transmission list for sending push notifications and to compute: (1) conversion probability values that indicate probabilities that users identified by the user-item pairs will purchase corresponding items identified by the user-item pairs; and (2) confidence indicators that indicate confidence measures in the conversion probability values; assigning the conversion probability values and the confidence indicators to the user-item pairs; generating a transmission list by selecting a portion of the user-item pairs based, at least in part, on the conversion probability values and the confidence indicators that are assigned to the user-item pairs; customizing content for the push notifications to include information for items identified by the user-item pairs included in the transmission list; and transmitting the push notifications to the users identified by the user-item pairs included in the transmission list.

Various embodiments include a method. The method can include: utilizing historical transaction information, stored on one or more non-transitory storage modules, to derive metric information associated with prior transactions; generating a listing of user-item pairs, each of the user-item pairs identifying a user and an item; executing, with one or more processing modules, a machine learning model that is configured to generate a transmission list for sending push notifications and to compute: (1) conversion probability values that indicate probabilities that users identified by the user-item pairs will purchase corresponding items identified by the user-item pairs; and (2) confidence indicators that indicate confidence measures in the conversion probability values; assigning the conversion probability values and the confidence indicators to the user-item pairs; generating a transmission list by selecting a portion of the user-item pairs based, at least in part, on the conversion probability values and the confidence indicators that are assigned to the user-item pairs; customizing content for the push notifications to include information for items identified by the user-item pairs included in the transmission list; and transmitting, with the one or more processing modules, the push notifications to the users identified by the user-item pairs included in the transmission list.

Existing push notification systems can be configured to transmit notifications to users that include information about purchasing items. For example, these conventional push notification systems can transmit notifications pertaining to items that are being offered in connection with certain promotions or sales offerings to individuals identified in a list of customers. Because these systems typically send the notifications to all of the individuals identified in the list in a non-discriminatory fashion, many of the individuals that receive the push notifications have no interest in purchasing the items identified by the push notifications. This often results in the notifications being ignored or deleted by the users. Consequently, these conventional techniques have low conversion rates with respect to customers purchasing the items identified by the push notifications. Moreover, sending the notifications in this manner wastes system resources, incurs unnecessary expenses and consumes bandwidth that could be allocated for other functions.

This disclosure herein describes novel push notification systems that utilize machine learning techniques to overcome the aforementioned problems, as well as other problems. In certain embodiments, a push notification system stores a machine learning model that effectively identifies users who are to receive push notifications, as well as items that are incorporated into the push notifications, in a manner that optimizes conversion rates, saves system resources and minimizes bandwidth consumption. The machine learning model derives various metrics (e.g., including both individualized and global inter-purchase interval values described in further detail below) from historical transaction information. The machine learning model executes an algorithm that utilizes the derived metrics to compute conversion probability values, which estimate how probable it is that a user will purchase a specific item, and corresponding confidence indicators, which indicate a level of confidence in each of the conversion probability values. The conversion probability values and confidence indicators are used to select a subset of users that will receive the push notifications, and to customize the items that are identified in the push notifications in a manner that is individualized to each of the users. In certain embodiments, the machine learning model enhances the accuracy of the conversion probability values and confidence indicators initially with training data that is used to calibrate the algorithm, and continuously thereafter by analyzing feedback from previous transmissions of the push notifications (e.g., by analyzing whether or not the items in the push notifications were purchased and/or reordered). In comparison to conventional techniques, these push notification transmission techniques optimize conversion rates, save system resources, avoid unnecessary expenses, and consume less bandwidth.

Referring back to FIG. 3, the system 300 includes a push notification system 310 that stores and executes a machine learning model 350. The push notification system 310 can include one or more computing devices (e.g., server devices and/or personal computers) that are configured to generate push notifications 360 and to transmit the push notifications 360 to user computers 340 operated by the users 305. The push notifications 360 can be sent directly to the user computers 340 and/or transmitted to the user computers 340 over the network 380. As discussed in further detail within this disclosure, the machine learning model 350 selects users 305 who will receive the push notifications 360 and customizes the content of the push notifications 360 using novel techniques.

The push notifications 360 that are transmitted to the users 305 can vary greatly. The push notifications 360 can be sent in the form of text messages, e-mails, automated phone calls, mobile phone alerts/notifications (e.g., alerts or notifications that appear on a mobile phone even when the device's screen is locked), inbox messages, and/or other types of notifications that are sent using other types of digital or analog formats. The push notifications 360 can include digital messages, alerts, advertisements, notices or other communications. The content of the push notifications 360 can include any type of content. For example, the push notifications 360 can include text, multimedia content (e.g., images, videos, audio recordings and/or animations), interactive components (e.g., hyperlinks, buttons and/or options that can cause applications to be opened and to present information to the users), and/or other data. In certain embodiments, as explained in further detail below, the push notifications 360 sent to each user includes a customized or individualized item listing comprising one or more items that the machine learning model 350 determined would be of interest to the user 305 (e.g., items that user 305 is likely to purchase). The push notifications 360 can include information (e.g., name, price, description and/or associated promotions) about the items. It should be noted that the terms "item" and "items," as used in this disclosure, are not intended to be limited to physical items (e.g., products). Rather, these terms are also intended to encompass service-based offerings and other non-physical offerings.

The push notifications 360 also can be configured with functionality that enables the users 305 who receive the push notifications 360 to order and/or purchase the items identified in the push notifications 360 by interacting with the push notifications 360. For example, users 305 can reply to the push notifications 360 (e.g., reply to text messages, e-mails or inbox message) to instantly order some or all of the items. The users 305 also can select interactive links to navigate to a website (e.g., hosted by the electronic platform 330) and/or an application (e.g., mobile application stored on the user computer 340) that enables the items to be purchased instantly. In certain embodiments, the push notifications 360 comprise notifications that identify items that were previously ordered by the users 305, and the push notifications 360 enable the users 305 to easily re-order the items. The push notifications 360 can also include other items that are likely to be purchased by the users 305 (e.g., items that are similar to previously ordered items, items that are in product categories that are determined to be of interest to the users 305, and/or items that are top-sellers and/or trending items).

In certain embodiments, the push notifications 360 are "pushed" to the user computers 340 in the sense that they are transmitted to the user computers 340 without being requested by the user computer 340. For example, a notification server hosting the push notification system 310 will periodically (e.g., daily, weekly or monthly) transmit the push notifications 360 to the user computers 340 without being requested by the user computers 340. In certain embodiments, the customized item listings generated by the techniques described herein also can be "pulled" by the user computers 340 from the push notification system 310. For example, after the users 305 login to a user account hosted on the electronic platform 330, the item listings generated by the push notification system 310 can be pulled by the user computers 340 and presented on the user computers 340.

The electronic platform 330 can be configured to provide a website for an online retailer or online shopping site that enables users 305 to browse offerings (e.g., products and/or services), place orders, make purchases, access online accounts, and perform other related activities over the network 380. The electronic platform 330 can further include an order management system. The order management system can perform various functions associated with tracking and processing orders received via the website, phone systems, physical store locations, and/or from other transaction channels.

The electronic platform 330 further comprises a database 370 that stores historical transaction information 375. The historical transaction information 375 can include any information associated with previous or on-going transactions (e.g., transactions corresponding to purchases, orders and/or cancellations that were placed via the electronic platform 330 or other transaction channels). For example, the historical transaction information 375 can include detailed information for all transactions that were previously conducted or that are currently being conducted. The detailed information can indicate the specific items purchased by the customers, the customers who purchased the items, the amount spent on each transaction, the dates of the transactions occurred, the transaction channels through which the transactions were conducted (e.g., indicating whether the transactions were processed at specific store locations, the electronic platform 330, phone systems or other transaction channels), the specific physical store locations where the transactions occurred (if applicable), and/or any other information related to the transactions. The historical transaction information 375 and/or database 370 can also include a catalog of items that are offered for sale by an entity (e.g., retailer or company) affiliated with the electronic platform 330. The historical transaction information 375 and/or database 370 can further include a list of customers (e.g., users 305) who have purchased items from the entity (e.g., electronic platform 330 or brick and mortar store locations). The customer list can include information associated with each of the customers (e.g., names, contact information, address, sex, age, and other information).

The machine learning model 350 utilizes the historical transaction information 375 to derive or compute a variety of different metrics that will be used to select the users 305 who receive the push notifications 360 and to customize the content of the push notifications 360. Generally speaking, the metrics derived or computed from the historical transaction information 375 can be utilized to maximize conversion rates with respect users purchasing items identified in the push notifications 360, and to reduce resource and bandwidth consumption by reducing the number of users 305, who receive the push notifications 360 and/or removing content from the push notifications 360 that is unlikely to be desired by the users 305. In certain embodiments, these metrics include the following:

(1) Inter-purchase intervals for items: An "inter-purchase interval" can represent the time period between purchases. The machine learning model 350 computes inter-purchase intervals for every item (e.g., every item in an item catalog) for each of the customers (e.g., for each customer identified in the customer list). That is, for each customer, the machine learning model 350 iterates through the item catalog and utilizes the historical transaction information 375 to determine if the customer purchased each of the items included in the item catalog. In the event that an item was purchased more than once, the machine learning model 350 identifies the time periods that lapsed between these purchases.

(2) Inter-purchase intervals for categories: The items in the item catalog can be arranged in a hierarchy of categories and sub-categories. For example, an iPhone® device can be classified in a category for "electronics" and a sub-category for "Apple® Products." This value is a similar value to the inter-purchase interval discussed above, except it is computed on a per category basis and not a per item basis. That is, these values reflect time periods that occurred between purchases by the customers for items within each of the categories (e.g., the time between purchases of items in the "electronics" category). This value is computed for each customer for every category.

(3) Inter-purchase intervals for sub-categories: Again, this value is a similar value to the inter-purchase intervals discussed above, except it is computed on a sub-category basis. That is, this value reflects time periods that occurred between purchases by the customer for items within the sub-categories (e.g., the time between purchases of items in the "Apple® Products" sub-category). This value is computed for each customer for every sub-category.

(4) Global inter-purchase intervals for items: This value represents the average time interval that occurs between purchases of an item. Unlike the values discussed above, this value is not individualized to each of the customers. Rather, it is a global value reflects how often an item is purchased by the customers as a whole (e.g., indicating an average time periods occurring between iPhone® purchases).

(5) Most recent purchase information: For each customer, the machine learning model determines the date of the most recent purchase that was made by the customer, the quantities of each item that was purchased in connection with the most recent transaction, and the transaction channel through which the purchase was placed (e.g., indicating whether the item was purchased via a website, in-store or phone system).

(6) Most recent purchase information per transaction channel: For each customer, the machine learning model identifies the date of the most recent purchase that was made through each transaction channel (e.g., the most recent purchase date of an item purchased through a website, most recent purchase date of an item purchased at an in-store location, and most recent purchase date of an item purchased via a phone system).

The above metrics derived from the historical transaction information 375 are examples of useful metrics that can be utilized by the machine learning model 350 determine which customers should receive the push notifications 360 and which items should be included in each of the push notifications 360. Other types of metrics and parameters can be derived from the historical transaction information 375 (and/or provided in other ways) and provided to the machine learning model 350.

The machine learning model 350 executes an algorithm that generates conversion probability values 352 that reflect an estimate of how probable it is that a customer (e.g., user 305) will purchase a specific items, and corresponding confidence indicators 353 that indicate a level of confidence in each of the conversion probability values 352. The metrics derived from the historical transaction information 375 are utilized as inputs to the algorithm and are utilized by the algorithm to generate the conversion probability values 352 and confidence indicators 353. For example, in certain embodiments, the algorithm can assign certain weights to each of the metrics, and the weighted metrics can be combined to generate the output values. As explained in further detail below, in certain embodiments, a conversion probability value 352 and a confidence indicator 353 are computed for each customer across all items in the item catalog (i.e., a conversion probability value 352 and confidence indicator 353 are computed and assigned to each product for every customer).

The conversion probability values 352 and confidence indicators 353 can be reflected in various ways. For example, in certain embodiments, a conversion probability value 352 can represent a value between 0 and 1 that identifies the probability of user purchasing an item. A conversion probability value of 0.75 can indicate there is a 75% chance that a customer would purchase an item, and a conversion probability value of 0.1 would indicate that there is a 10% chance that a customer would purchase the item. The conversion probability values 352 can be computed using other types of scaled values (e.g., on a scale from 1-10 or 1-100). The conversion probability values 352 can be computed in other ways as well, and other types of values can be utilized to express the conversion probability values 352.

In certain embodiments, the confidence indicators 353 are specified using standard deviation values. For example, as discussed in further detail below, after the conversion probability values 352 are generated, the machine learning model 350 can determine a standard deviation of the conversion probability values 352, and each confidence indicator 353 is expressed as the standard deviation of a corresponding conversion probability value 352. For example, if a conversion probability value was determined to be 0.5 (e.g., indicating that a customer had a 50% chance of purchasing a specific item), then the machine learning model 350 can calculate the standard deviation of this value (with respect to the other conversion probability values 352 that were computed) to be used as the confidence indicator 353. The confidence indicators 353 can be computed in other ways as well, and other types of values can be utilized to express the confidence indicators 353.

In certain embodiments, the machine learning model 350 iterates through a customer list and, for each customer, computes a single conversion probability value 352 and single confidence indicator 353 for each item that is included in the item catalog. That is, for each customer, the machine learning model 350 estimates the customer's interest in each item that is included in the item catalog. For every such "user-item" pair 351, the machine learning model 350 computes a conversion probability value 352 and a confidence indicator 353. Therefore, every customer will be associated with a list of user-item pairs 351, and each of the user-item pairs 351 will be associated with a conversion probability value 352 and a confidence indicator 353 that can be utilized to determine the likelihood that the customer will purchase the item corresponding to the user-item pair 351. For example, if an item catalog included five different pairs of shoes (i.e., Shoes-1, Shoes-2, Shoes-3, Shoes-4 and Shoes-5), the machine learning model 350 would iterate through a customer list and generate user-item pairs 351 for each of the customer for each pair of shoes (i.e., (Cust-1, Shoes-1), (Cust-1, Shoes-2), (Cust-1, Shoes-3), (Cust-1, Shoes-4), (Cust-1, Shoes-5), (Cust-2, Shoes-1), (Cust-2, Shoes-2), (Cust-2, Shoes-3), (Cust-2, Shoes-4), (Cust-2, Shoes-5), (Cust-3, Shoes-1), etc.) and a conversion probability value 352 and a confidence indicator 353 would be generated for each user-item pair 351. The conversion probability value 352 and the confidence indicator 353 assigned to a user-item pair 351 can be used to determine whether the customer identified in in the user-item pair 351 is likely to purchase the item identified in the corresponding user-item pair 351.

After the machine learning model 350 computes the listing of user-item pairs 351 and assigns each user-item pair 351 a corresponding conversion probability value 352 and confidence indicator 353, the machine learning model 350 filters the listing by analyzing the conversion probability values 352 and confidence indicators 353 to identify the items that customers are interested in purchasing. If it is determined that the customer identified in a user-item pair 351 is unlikely to purchase the corresponding item identified in the user pair 351, then that user-item pair 351 is eliminated from the listing. This serves to filter the listing to only include user-item pairs 351 that identify items that are of interest to the corresponding customers identified in the user-item pair 351.

In certain embodiments, the filtering of the user-item pairs 351 is accomplished using a multi-step filtering technique that eliminates irrelevant user-item pairs 351 by iterating through each of the user-item pairs 351 and comparing the conversion probability values 352 and the confidence indicators 353 to threshold values. More specifically, the machine learning model 350 can identify a first subset of user-item pairs 351 by iterating through each of the user-item pairs 351 and comparing each of the confidence indicators 353 to a first threshold. Any user-item pairs 351 having a confidence indicator reflecting a low confidence level can be eliminated or removed from the subset. For example, as explained above, each confidence indicator 353 can be expressed as a value that reflects the standard deviation of the corresponding conversion probability value 352 included in a user-item pair 351. The standard deviation values can be compared to a threshold (e.g., which may be set to identify standard deviations falling with the $10^{th}$ percentile), and the user-item pairs 351 having a standard deviation value above the threshold are excluded from the first subset, while the user-item pairs 351 having a standard deviation value below the threshold are included in the first subset.

The machine learning model 350 can identify a second subset of user-item pairs 351 by iterating through each of the user-item pairs 351 and comparing each of the conversion probability values 352 to a second threshold. Any user-item pairs 351 having a conversion probability value 352 indicating an unacceptably low probability are eliminated from the second subset. For example, as explained above, the conversion probability values 352 can be expressed as a scaled value (e.g., ranging on scale from 0 to 1) that indicates a likelihood that a customer identified in a user-item pair 351 will purchase the corresponding item identified in the user-item pair 351. The scaled values can be compared to a threshold (e.g., which may be set to 0.9 if the scale is ranging from 0 to 1) and the user-item pairs 351 having a value below the threshold are excluded from the second subset, while the user-item pairs 351 having a value above the threshold are included in the second subset.

It should be recognized that the first and second thresholds mentioned above can be set to any value. The aforementioned thresholds are merely intended to be used as examples, but can be useful in certain embodiments where it is intended that user-item pair 351 information only be included in the push notifications 360 when there is a high probability that the user will purchase the item identified by the user-item pair 351 and there is a high level of confidence in the computed conversion estimate.

Moving on, the machine learning model 350 can then compute the intersection of the first subset and the second subset (i.e., first subset∩second subset). Any user-item pairs 351 that are included in the resulting intersection set (i.e., the user-items 351 pairs are included in both the first and second subsets) represent user-item pairs 351 that that the machine learning model 350 identified as having a sufficiently high probability of conversion and a sufficiently high confidence measure in the estimate.

The machine learning model 350 generates a transmission list that includes all of these user-item pairs 351 that are included in the intersection set. The transmission list can represent a listing of all of the user-item pairs 351 that can be transmitted in push notifications to the customers. The push notification system 310 can transmit the push notifications 360 to the customers via one or more communication channels (e.g., via text messages, mobile phone notifications and/or e-mail). The communication channels can be based on stored customer preferences that reflect the customers' preferred method of receiving the push notifications 360. The push notifications 360 can enable the customers to purchase and/or reorder items identified in the push notifications 360.

In certain embodiments, an additional filter is applied to eliminate user-item pairs 351 included in the transmission list before the push notifications 360 are transmitted. The additional filtering step can iterate through all of the user-item pairs 351 included in the transmission, and divide the user-item pairs 351 into groups on a per user basis. That is, each group will include the user-item pairs 351 associated with a specific customer. The machine learning model 350 will analyze pricing information for the user-item pairs 351 in each group. The user-item pairs 351 in a group will be eliminated or excluded from the transmission list if they collectively do not add up to a minimum price threshold (e.g., $20 dollars). The minimum price threshold can be based on a price that is required to take advantage of shipping promotions or options (e.g., free shipping options and/or discounted shipping options).

The user-item pairs 351 remaining in the transmission list can then be incorporated into push notifications 360 and transmitted to the users 305 over the network 380. The filtering techniques described above ensure that the items included the transmission list are customized to the interests of the users 305. The push notifications 360 can be further customized to include information stored in the database 370 that is specific to the user (e.g., which includes customer names and account information). The push notifications 360 are configured to be interactive to permit the users 305 to re-order or purchase the items identified in the push notifications 360.

In certain embodiments, the machine learning model 350 utilizes a supervised learning technique to train the machine learning model. Training data may be provided to the machine learning model 350 that teaches the machine learning model to accurately compute the conversion probability values and the confidence indicators. In certain embodiments, the training data can include historical transaction information 370, metrics derived from the historical transaction information, exemplary conversion probability values 352 and/or exemplary confidence indicators 353 that are used to teach the machine learning model 350 to accurately compute the conversion probability values 352 and the confidence indicators 351 and to select the threshold values discussed above. In certain embodiments, the supervised learning technique that is used by the machine learning model 350 implements an active learning method to compute the conversion probability values 352 and the confidence indicators 351, and to select the threshold values discussed above.

In certain embodiments, the machine learning model 350 utilizes feedback from prior push notification transmissions to hone the accuracy of the conversion probability values 352 and the confidence indicators 351, and to select the threshold values discussed above. For example, the machine learning model 350 can analyze historical transaction information 375 and information associated with prior transmissions of push notification to determine whether or not items identified in the push notifications 360 were purchased by the customers that received the push notifications 360. This information can be utilized to adjust the conversion probability values 352, the confidence indicators 351, and/or the threshold values discussed above.

As evidenced by this disclosure, the principles described herein are rooted in computer technologies that overcome existing problems in known push notification systems, specifically problems dealing with increasing available bandwidth and system resources and effectively customizing of push notifications to maximize conversion rates. Known push notification systems waste bandwidth and resources by unnecessarily transmitting large amounts of data over the network 380 to users 305 in push notifications 360, which are not desired by many of the users and/or which do not include content of interest to the users 305. The principles described in this disclosure provide a technical solution (e.g., one that utilizes novel machine learning techniques) for overcoming such problems. For example, the machine learning techniques disclosed herein can be used to minimize the number of users who receive the push notifications and/or the amount of content included in the push notifications in an intelligent manner that decreases network bandwidth and resource consumption, while maximizing conversion rates. The selection of the users and/or content can be based on training data and continuously improved over time using feedback provided to the system. This technology-based solution marks an improvement over existing computing capabilities and functionalities related to push notifications systems. The novel systems are designed to improve the way push notifications are generated and transmitted to users.

Figure 4:
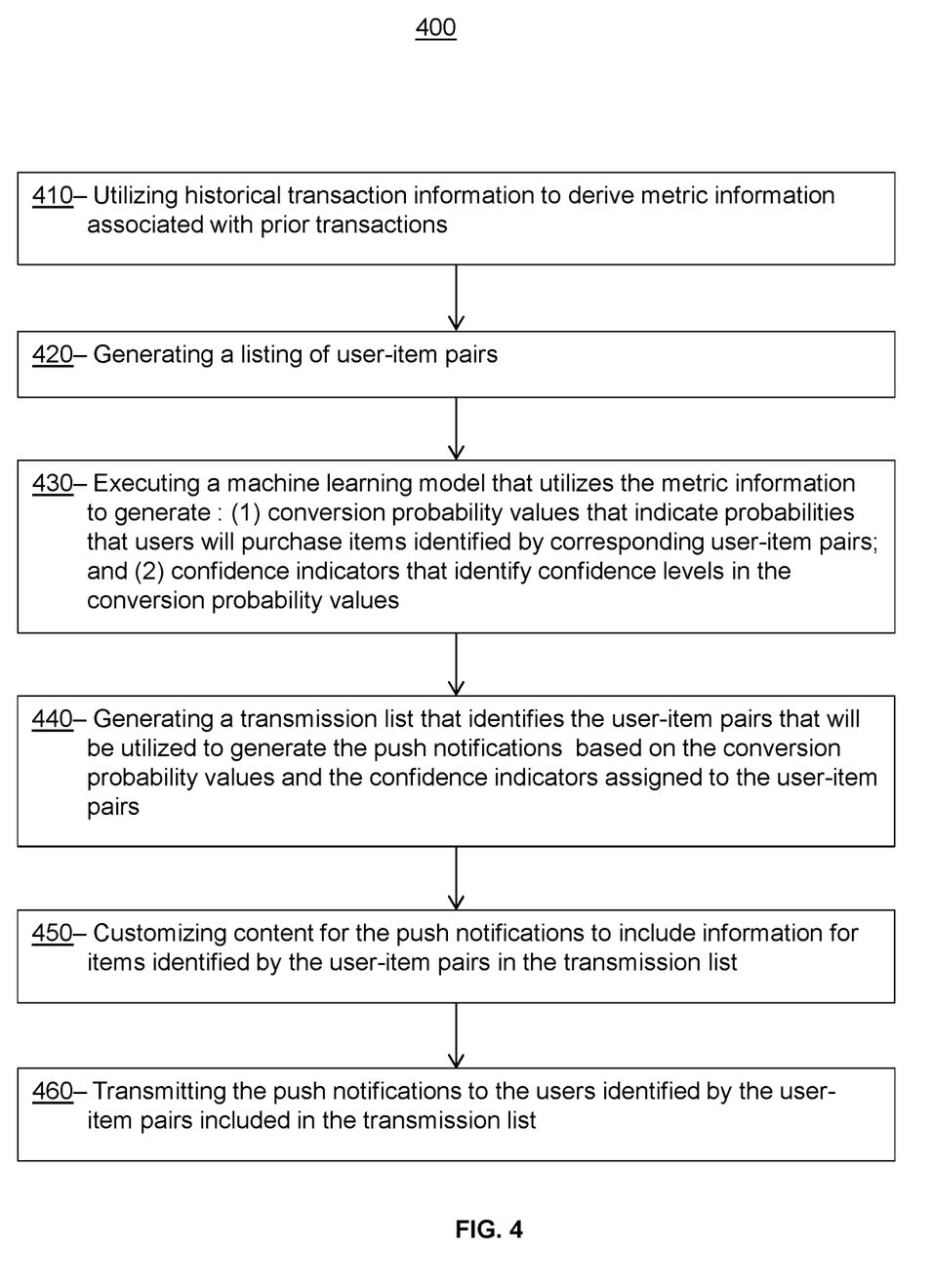
FIG. 4 is a flowchart for a method according to certain embodiments.
Figure 6:
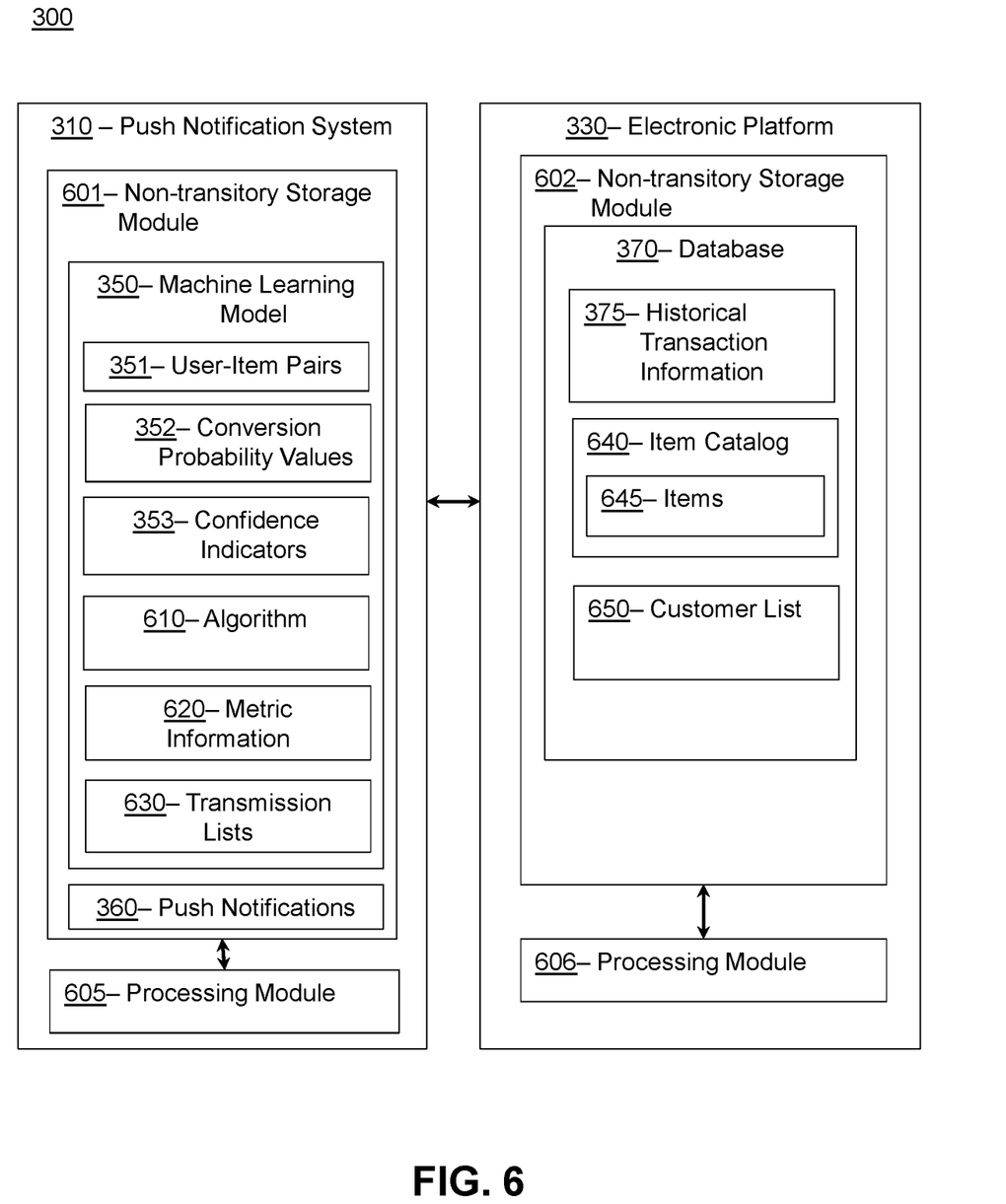
FIG. 6 illustrates a representative block diagram of a portion of the system of FIG. 3 according to certain embodiments.

Turning to the next drawing, FIG. 4 illustrates a flow chart for a method 400 according to certain embodiments. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules 605, 606 (FIG. 6) and configured to be stored at one or more non-transitory memory storage modules 601, 602 (FIG. 6). Such non-transitory memory storage modules can be part of a computer system such as push notification system 310 (FIGS. 3 & 6) and/or electronic platform 330 (FIGS. 3 & 6). The processing module(s) can be similar or identical to the processing module(s) described above with respect to computer system 100 (FIG. 1).

Method 400 can comprise an activity 410 of utilizing historical transaction information 375 (FIGS. 3 & 6) to derive metric information 620 (FIG. 6) associated with prior transactions. As explained above, the historical transaction information 375 (FIGS. 3 & 6) can be stored in the database 370 (FIGS. 3 & 6) on the electronic platform 330 (FIGS. 3 & 6) and can include any information associated with previous transactions (e.g., purchases, orders and/or cancellations that were placed via the electronic platform or other transaction channel). For example, the historical transaction information 375 (FIGS. 3 & 6) can include detailed information associated with previous transactions (e.g., information which indicates the specific items purchased by the customers, the customers who purchased the items, the amount spent on each transaction, the dates of the transactions occurred, etc.). The metric information 620 (FIG. 6) derived from the historical transaction information 375 (FIGS. 3 & 6) can include the individualized inter-purchase intervals, global inter-purchase interval values, and other metrics described above.

Method 400 can further comprise an activity 420 of generating a listing of user-item pairs 351 (FIGS. 3 & 6). As explained above, each user-item pair 351 (FIGS. 3 & 6) can correspond to a specific customer and a specific item. The machine learning model 350 (FIGS. 3 & 6) can iterate through an item catalog and customer list to generate a listing of user-item pairs 351 (FIGS. 3 & 6) for each customer. In some embodiments, the number of user-items pairs 351 (FIGS. 3 & 6) can be determined by multiplying the number of customers by the number of items included in the item catalog.

Method 400 can further comprise an activity 430 of executing a machine learning model 350 (FIGS. 3 & 6) that utilizes the metric information to generate (1) conversion probability values that indicate probabilities that users will purchase items identified by corresponding user-item pairs, and (2) confidence indicators that identify confidence levels in the conversion probability values. As explained above, the machine learning model 350 (FIGS. 3 & 6) can assign a conversion probability value 352 (FIGS. 3 & 6) to each of the user-item pairs. The conversion probability value 352 (FIGS. 3 & 6) assigned to a user-item pair can be represented using scaled values that indicate a probability that a user identified by the user-item pair will purchase a corresponding item identified by the user-item pair. After the conversion probability values have been assigned to each of the user-item pairs, the machine learning model 350 (FIGS. 3 & 6) can then assign confidence indicators 353 (FIGS. 3 & 6) to each of the conversion probability values. In certain embodiments, the confidence indicators 353 (FIGS. 3 & 6) can be generated by analyzing the conversion probability values and computing standard deviations for each of the conversion probability values. The standard deviation values can represent confidence measures for the conversion probability values. The conversion probability values 352 (FIGS. 3 & 6) and confidence indicators 353 (FIGS. 3 & 6) can be computed in other ways and can be represented by other types of values.

Method 400 can further comprise an activity 440 of generating a transmission list 630 (FIG. 6) that identifies the user-item pairs 351 (FIGS. 3 & 6) that will be utilized to generate the push notifications 360 (FIGS. 3 & 6) based on the conversion probability values 352 (FIGS. 3 & 6) and the confidence indicators 353 (FIGS. 3 & 6) assigned to the user-item pairs. As explained above, the transmission list 630 (FIG. 6) can be generated by comparing the conversion probability values 352 (FIGS. 3 & 6) and confidence indicators 353 (FIGS. 3 & 6) assigned to the user-item pairs to threshold values. The threshold values can be set to any appropriate value to reflect acceptable probabilities and confidence measures for user-item pairs that are to be included in the transmission list 630 (FIG. 6). In certain embodiments, even if the conversion probability values and confidence indicators for user-item pairs 351 (FIGS. 3 & 6) fall within acceptable thresholds, the user-item pairs can still be eliminated from the transmission list 630 (FIG. 6) if the user-items associated with a specific customer do not satisfy other requirements (e.g., the combined prices for items associated with user-item pairs does not exceed a minimum price that would allow the customer to take advantage of free shipping options). In certain embodiments, the method 500 of FIG. 5, which is discussed in further detail below, can be utilized to generate the transmission list 630 (FIG. 6).

Method 400 can further comprise an activity 450 of customizing content for the push notifications 360 (FIGS. 3 & 6) to include information for items identified by the user-item pairs 351 (FIGS. 3 & 6) in the transmission list 630 (FIG. 6). That is, the push notifications are populated with information for items corresponding to the user-item pairs. The techniques for filtering the user-item pairs 351 (FIGS. 3 & 6) with the conversion probability values and confidence indicators serve to customize the content that is provided to each customer by only identifying items that are determined to be of interest to the customers.

Method 400 can further comprise an activity 460 of transmitting the push notifications 360 (FIGS. 3 & 6) to the users identified by the user-item pairs included in the transmission list 630 (FIG. 6). The push notifications can be transmitted to the customers via text messages, e-mails, and/or other forms of communication. The push notifications 360 (FIGS. 3 & 6) can be accessed by the customers using the user computers 340 (FIG. 3).

Figure 5:
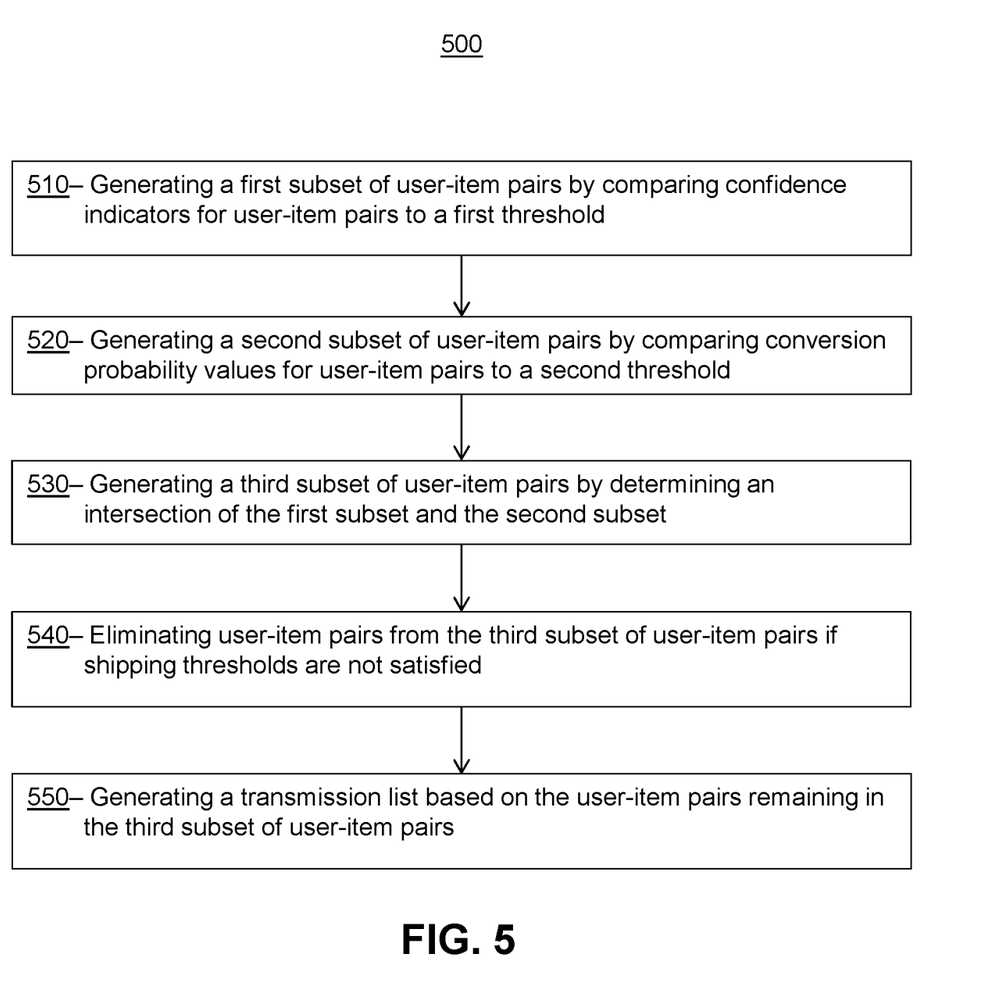
FIG. 5 is a flowchart for another method according to certain embodiments.

Turning to the next drawing, FIG. 5 illustrates a flow chart for a method 500 according to certain embodiments. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In many embodiments, system 300 (FIG. 3) can be suitable to perform method 500 and/or one or more of the activities of method 500. In these or other embodiments, one or more of the activities of method 500 can be implemented as one or more computer instructions configured to run at one or more processing modules 605, 606 (FIG. 6) and configured to be stored at one or more non-transitory memory storage modules 601, 602 (FIG. 6). Such non-transitory memory storage modules can be part of a computer system such as push notification system 310 (FIGS. 3 & 6). The processing module(s) can be similar or identical to the processing module(s) described above with respect to computer system 100 (FIG. 1).

Method 500 can be utilized to generate a transmission list 630 (FIG. 6) comprising user-item pairs that are to be included in push notifications 360 (FIGS. 3 & 6) transmitted to users 305 (FIG. 3). In certain embodiments, the method 500 can be utilized to perform activity 440 described above with respect to FIG. 4.

Method 500 can comprise an activity 510 of generating a first subset of user-item pairs 351 (FIGS. 3 & 6) by comparing confidence indicators for user-item pairs to a first threshold. As explained above, a confidence indicator 353 (FIGS. 3 & 6) can be computed for each user-item pair 351 (FIGS. 3 & 6) that identifies a confidence level or confidence measure in a corresponding conversion probability value for the user-item pair. In certain embodiments, the confidence indicators 353 (FIGS. 3 & 6) can represent standard deviations of corresponding conversion probability values 352 (FIGS. 3 & 6). The confidence indicators 353 (FIGS. 3 & 6) for each user-item pair 351 (FIGS. 3 & 6) are compared to a first threshold that identifies an acceptable confidence level. If the confidence indicator for a user-item pair 351 (FIGS. 3 & 6) is within an acceptable range (e.g., is below a certain standard deviation threshold value), then the user-item pair is added to the first subset of user-item pairs.

Method 500 can further comprise an activity 520 of generating a second subset of user-item pairs 351 (FIGS. 3 & 6) by comparing conversion probability values 352 (FIGS. 3 & 6) for user-item pairs to a second threshold. As explained above, a conversion probability value 352 (FIGS. 3 & 6) can be computed for each user-item pair 351 (FIGS. 3 & 6) that identifies a probability or estimate of a customer's interest in purchasing an item 645 (FIG. 6) associated with the user-item pair. In certain embodiments, the conversion probability values can represent scaled values (e.g., on scale of 0 to 1 or a scale of 1 to 100). The conversion probability values 352 (FIGS. 3 & 6) for each user-item pair are compared to a second threshold that identifies an acceptable probability or estimate of a user's interest in purchasing the item associated with the user-item pair 351 (FIGS. 3 & 6). If the conversion probability value for a user-item pair indicates is acceptable (e.g., is above a certain threshold value indicating an acceptable probability of estimate), then the user-item pair is added to the second subset of user-item pairs.

Method 500 can further comprise an activity 530 of generating a third subset of user-item pairs 351 (FIGS. 3 & 6) by determining an intersection of the first subset and the second subset. That is, the third subset of user-item pairs 351 (FIGS. 3 & 6) is identified by determining the user-item pairs 351 (FIGS. 3 & 6) that are included in both the first and second set. Thus, the user-item pairs 351 (FIGS. 3 & 6) included in the third subset of user-item pairs 351 (FIGS. 3 & 6) will represent the user pairs that are identified as having both a sufficiently high probability of being purchased and a sufficiently high confidence level in the value reflecting the probability of being purchased.

Method 500 can further comprise an activity 540 of eliminating user-item pairs 351 (FIGS. 3 & 6) from the third subset of user-item pairs if shipping thresholds are not satisfied. The machine learning model 350 (FIGS. 3 & 6) can analyze the remaining user-item pairs that are included in the third subset of user-item pairs and, for each customer, identify the user-item pairs that are applicable to the customer. The prices of items identified by the user-item pairs 351 (FIGS. 3 & 6) for a customer can be tallied, and the user-item pairs 351 (FIGS. 3 & 6) for the customer will be removed from the third subset of user-items if the combined price does not exceed a certain threshold price (e.g., a threshold price that would permit the customer to take advantage of free shipping options).

Method 500 can further comprise an activity 550 of generating a transmission list 630 (FIG. 6) based on the user-item pairs 351 (FIGS. 3 & 6) remaining in the third subset of user-item pairs. Any user-item pairs 351 (FIGS. 3 & 6) that remain in the third subset of user-item pairs after the above filtering technique is perform are included in the transmission list. Push notifications are then customized by selecting a subset of customers to receive the push notifications (as identified by the remaining user-item pairs), and tailoring the content of the push notifications 360 (FIGS. 3 & 6) to include information for relevant items that are of interest to the customers (as identified by the remaining user-item pairs).

FIG. 6 illustrates a block diagram of a portion of system 300 comprising the push notification system 310 and the electronic platform 330 in FIG. 3 according to certain embodiments. Each of the push notification system 310 and the electronic platform 330, is merely exemplary and not limited to the embodiments presented herein. Each of the push notification system 310 and the electronic platform 330, can be employed in many different embodiments or examples not specifically depicted or described herein. In some embodiments, certain elements or modules of the push notification system 310 and the electronic platform 330, can perform various procedures, processes, and/or acts. In other embodiments, the procedures, processes, and/or acts can be performed by other suitable elements or modules.

As shown therein, the push notification system 310 and electronic platform 330 can each include one or more non-transitory storage modules and one or more processing modules. For example, push notification system 310 and electronic platform 330 can comprise non-transitory storage modules 601 and 602, respectively, and processing modules 605 and 606, respectively.

The electronic platform 330 can store an item catalog 640 and a customer list 650. The item catalog 640 can include a listing of items 645 and corresponding information associated with each of the items 645 (e.g., item name, item description, item price and other associated data). The customer list 650 can include a listing of customers, potential customers, and/or other individuals. The individuals included in the customer list 650 can include the user 305 (FIG. 3) associated with the user computers 340 (FIG. 3). The customer list 650 can include information (e.g., customer name, postal address, e-mail address, phone number, age, and other types of customer data) associated with the each of the individuals identified in the customer list.

As explained above, the electronic platform 330 can also store historical transaction information 375 in a database 370. The historical transaction information 375 can include information pertaining to prior or ongoing transactions. For example, the historical transaction information 375 can include, inter alia, information associated with previous purchases of items 645 included in the item catalog 640 by the customers or potential customers identified in the customer list 650.

The historical transaction information 375 can be utilized by the machine learning model 350 to derive and compute various types of metric information 620. The metric information 620 can include the above-described metrics that include: inter-purchase intervals for items, inter-purchase intervals for categories, inter-purchase intervals for sub-categories, global inter-purchase intervals for items, most recent information, and/or most recent purchase information per transaction channel. Other types of metric information 620 also can be generated. In certain embodiments, the machine learning model 350 utilizes these metrics can be utilized to determine how frequently customers purchase certain items (or items in certain categories and sub-categories), how often customers reorder items (or items in certain categories and sub-categories), and which transaction channels customers use to purchase the items.

The machine learning model 350 can generate and store a listing of user-item pairs 351 as explained above. The machine learning model 350 can compute, assign and associate a conversion probability value 352 and a confidence indicator 353 with each of the user-item pairs 351. In certain embodiments, the machine learning model 350 generates the conversion probability values 352 and the confidence indicators 353 for each of the user-item pairs 351 using an algorithm 610 that is stored in machine learning model 350. The algorithm 610 receives the metric information 620 as inputs and utilizes the metric information 620 to compute outputs for each of the user-item pairs 351, which comprise the conversion probability values 352 and the confidence indicators 353.

After the algorithm 610 is used to generate and assign the conversion probability values 352 and the confidence indicators 353 to the user-item pairs 351, the machine learning model 350 selects a subset of the user-item pairs 351 to be included in a transmission list 630. As explained above, the user-item pairs 351 included in the transmission list 630 can be identified by comparing the conversion probability values 352 and the confidence indicators 353 to thresholds. Push notifications are sent to customers with content that is customized to include information associated with the user-item pairs 351 in the transmission list 630.

Although systems and methods for transmitting push notifications have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 can be modified, and that the foregoing discussion of certain of these embodiments does not necessarily represent a complete description of all possible embodiments. For example, one or more of the procedures, processes, or activities of FIGS. 4 and 5 can include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processing modules; and
one or more non-transitory storage modules storing computing instructions configured to run on the one or more processing modules and perform acts of:
utilizing historical transaction information to derive metric information associated with prior transactions;
generating a listing of user-item pairs, each of the user-item pairs identifying a user and an item;
executing a machine learning model that is configured to generate a transmission list for sending push notifications, the machine learning model utilizing the metric information to compute:
(1) conversion probability values that indicate probabilities that users identified by the user-item pairs will purchase corresponding items identified by the user-item pairs; and
(2) confidence indicators that indicate confidence measures in the conversion probability values;
assigning the conversion probability values and the confidence indicators to the user-item pairs;
generating the transmission list by selecting a portion of the user-item pairs based, at least in part, on the conversion probability values and the confidence indicators that are assigned to the user-item pairs;
customizing content for the push notifications to include information for items identified by the user-item pairs included in the transmission list; and
transmitting the push notifications to the users identified by the user-item pairs included in the transmission list.

2. The system of claim 1, wherein a supervised learning technique is utilized to train the machine learning model by providing the machine learning model with training data that teaches the machine learning model to compute the conversion probability values and the confidence indicators.

3. The system of claim 1, wherein the metric information derived from the historical transaction information includes at least:
a first set of inter-purchase intervals identifying time periods between purchases of the items for each of the users;
a second set of inter-purchase intervals identifying time periods between purchases of the items in pre-defined item categories for each of the users;
global inter-purchase intervals identifying average time periods between purchases of the items collectively for the users; and
previous purchase dates that identify when the users last purchased the items.

4. The system of claim 3, wherein the first set of inter-purchase intervals, the second set of inter-purchase intervals, the global inter-purchase intervals and the previous purchase dates are received as inputs to an algorithm that is executed by the machine learning model, and the algorithm utilizes the inputs to determine the conversion probability values and the confidence measures for each of the user-item pairs.

5. The system of claim 1, wherein the portion of the user-item pairs to be included in the transmission list are selected by determining an intersection of:
a first subset of the user-item pairs that is identified by comparing the confidence indicators to a first threshold; and
a second subset of the user-item pairs that is identified by comparing the conversion probability values to a second threshold.

6. The system of claim 5, wherein the confidence indicators are standard deviation values associated with the conversion probability values.

7. The system of claim 6, wherein the first subset of the user-item pairs is identified by comparing the standard deviation values to the first threshold that identifies a maximum standard deviation value that is acceptable; and
wherein the user-item pairs having standard deviation values below the maximum standard deviation value are selected to be included in the first subset of the user-item pairs.

8. The system of claim 7, wherein the second subset of the user-item pairs is identified by comparing the conversion probability values to the second threshold that comprises a minimum conversion probability value; and
wherein the user-item pairs having conversion probability values above the minimum conversion probability value are selected to be included in the second subset of the user-item pairs.

9. The system of claim 1, wherein the push notifications include options that enable the users to order the items identified in the push notifications.

10. The system of claim 1, wherein the machine learning model is configured to receive feedback indicating whether or not the users who previously received the push notifications purchased items identified in the push notifications; and
wherein the feedback is utilized to modify calculations of the machine learning model by adjusting how the conversion probability values and the confidence indicators are computed.

11. A method comprising:
utilizing historical transaction information, stored on one or more non-transitory storage modules, to derive metric information associated with prior transactions;
generating a listing of user-item pairs, each of the user-item pairs identifying a user and an item;
executing, with one or more processing modules, a machine learning model that is configured to generate a transmission list for sending push notifications, the machine learning model utilizing the metric information to compute:
(1) conversion probability values that indicate probabilities that users identified by the user-item pairs will purchase corresponding items identified by the user-item pairs; and
(2) confidence indicators that indicate confidence measures in the conversion probability values;
assigning the conversion probability values and the confidence indicators to the user-item pairs;
generating the transmission list by selecting a portion of the user-item pairs based, at least in part, on the conversion probability values and the confidence indicators that are assigned to the user-item pairs;
customizing content for the push notifications to include information for items identified by the user-item pairs included in the transmission list; and
transmitting, with the one or more processing modules, the push notifications to the users identified by the user-item pairs included in the transmission list.

12. The method of claim 11, wherein a supervised learning technique is utilized to train the machine learning model by providing the machine learning model with training data that teaches the machine learning model to compute the conversion probability values and the confidence indicators.

13. The method of claim 11, wherein the metric information derived from the historical transaction information includes at least:
- a first set of inter-purchase intervals identifying time periods between purchases of the items for each of the users;
- a second set of inter-purchase intervals identifying time periods between purchases of the items in pre-defined item categories for each of the users;
- global inter-purchase intervals identifying average time periods between purchases of the items collectively for the users; and
- previous purchase dates that identify when the users last purchased the items.

14. The method of claim 13, wherein the first set of inter-purchase intervals, the second set of inter-purchase intervals, the global inter-purchase intervals and the previous purchase dates are received as inputs to an algorithm that is executed by the machine learning model, and the algorithm utilizes the inputs to determine the conversion probability values and the confidence measures for each of the user-item pairs.

15. The method of claim 11, wherein the portion of the user-item pairs to be included in the transmission list are selected by determining an intersection of:
- a first subset of the user-item pairs that is identified by comparing the confidence indicators to a first threshold; and
- a second subset of the user-item pairs that is identified by comparing the conversion probability values to a second threshold.

16. The method of claim 15, wherein the confidence indicators are standard deviation values associated with the conversion probability values.

17. The method of claim 16, wherein the first subset of the user-item pairs is identified by comparing the standard deviation values to the first threshold that identifies a maximum standard deviation value that is acceptable; and
- wherein the user-item pairs having standard deviation values below the maximum standard deviation value are selected to be included in the first subset of the user-item pairs.

18. The method of claim 17, wherein the second subset of the user-item pairs is identified by comparing the conversion probability values to the second threshold that comprises a minimum conversion probability value; and
- wherein the user-item pairs having conversion probability values above the minimum conversion probability value are selected to be included in the second subset of the user-item pairs.

19. The method of claim 11, wherein the push notifications include options that enable the users to order the items identified in the push notifications.

20. The method of claim 11, wherein the machine learning model is configured to receive feedback indicating whether or not the users who previously received the push notifications purchased items identified in the push notifications; and
- wherein the feedback is utilized to modify calculations of the machine learning model by adjusting how the conversion probability values and the confidence indicators are computed.

* * * * *